US010581243B2

(12) United States Patent
Van Vliet et al.

(10) Patent No.: US 10,581,243 B2
(45) Date of Patent: Mar. 3, 2020

(54) POWER DISTRIBUTION APPARATUS

(75) Inventors: Johannes Antonius Van Vliet, Schenefeld (DE); Robert Paul Kleihorst, Best (NL); Bernhard Wagner, Hamburg (DE); Marinus Johannes Adrianus Maria Van Helvoort, Leende (NL); Peter-Christian Erich Heinrich Hans-Joachim Leymann, Hamburg (DE); Arno Ostendorf, Bargteheide (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 2290 days.

(21) Appl. No.: 13/375,824

(22) PCT Filed: Jun. 21, 2010

(86) PCT No.: PCT/IB2010/052787
§ 371 (c)(1),
(2), (4) Date: Dec. 2, 2011

(87) PCT Pub. No.: WO2010/150168
PCT Pub. Date: Dec. 29, 2010

(65) Prior Publication Data
US 2012/0083936 A1    Apr. 5, 2012

(30) Foreign Application Priority Data

Jun. 26, 2009 (EP) .................................... 09163880

(51) Int. Cl.
*H02J 3/14*    (2006.01)
(52) U.S. Cl.
CPC ............. *H02J 3/14* (2013.01); *Y02B 70/3225* (2013.01); *Y02P 80/11* (2015.11); *Y04S 20/222* (2013.01)

(58) Field of Classification Search
CPC ........................................................ H02J 3/14
(Continued)

(56) References Cited

U.S. PATENT DOCUMENTS 4,644,438 A * 2/1987 Puccinelli et al. .............. 361/75
4,689,712 A * 8/1987 Demeyer ........................ 361/96
(Continued)

FOREIGN PATENT DOCUMENTS

WO    2004075343 A1    4/2004
WO    2009072985 A1    6/2009

OTHER PUBLICATIONS

Norman T. Stringer, "An enhanced method of providing sensitive bus fault protection", IEEE Transactions on Industry Applications, IEEE Service Center, Piscataway, NJ, Us LNKD-DOI:10.1109/TIA.2003.810932, vol. 39, No. 3, May 1, 2003, pp. 600-604, XP011096835, XP011096835.

(Continued)

*Primary Examiner* — Tejal Gami

(57) ABSTRACT

The invention relates to an electrical power distribution apparatus (100) connectible to one or more loads (119). The electrical power distribution apparatus (100) comprises inter alia one or more taps (112) for supplying the loads (119) with electrical power. On top of circuit breakers (108) to switch off the power supply in order to protect the loads against damage, there is also arranged a second layer of soft fuse switches (110) which are arranged to switch on or off the power supply at the taps (112) to control distribution of the power. The soft fuses (110) operate in dependence on and in response to commands issued from a controller (105) which in turn operates and issues those commands in response to and independence on the voltages and amperages monitored at those taps (112) by way of a monitoring module (111). Switching on/off occurs at amperage and (Continued)

voltages lower than the critical threshold values to which the circuit breakers (108) respond to.

1 Claim, 3 Drawing Sheets

(58) Field of Classification Search
USPC .................................................. 700/286, 276
See application file for complete search history.

(56) References Cited

U.S. PATENT DOCUMENTS

| | | | | |
|---|---|---|---|---|
| 5,267,473 | A * | 12/1993 | Bezos et al. ..................... | 73/129 |
| 5,381,554 | A * | 1/1995 | Langer et al. ................... | 714/14 |
| 5,627,716 | A * | 5/1997 | Lagree et al. ............... | 361/93.2 |
| 5,808,376 | A * | 9/1998 | Gordon .................. | G01T 1/175 |
| | | | | 307/64 |
| 5,920,727 | A * | 7/1999 | Kikinis ..................... | G06F 1/32 |
| | | | | 703/17 |
| 6,191,500 | B1 * | 2/2001 | Toy .......................... | H02J 3/46 |
| | | | | 307/64 |
| 6,496,342 | B1 * | 12/2002 | Horvath et al. ................ | 361/65 |
| 6,618,649 | B1 * | 9/2003 | Shilo ............................ | 700/292 |
| 6,886,152 | B1 * | 4/2005 | Kong ................. | G06F 17/5054 |
| | | | | 716/128 |
| 7,324,876 | B2 * | 1/2008 | Ying .......................... | 700/295 |
| 8,904,074 | B2 * | 12/2014 | Lee ..................... | G05B 19/054 |
| | | | | 710/104 |
| 2003/0187550 | A1 * | 10/2003 | Wilson et al. ................ | 700/295 |
| 2004/0075343 | A1 | 4/2004 | Wareham et al. | |
| 2005/0207081 | A1 | 9/2005 | Ying | |
| 2005/0280970 | A1 | 12/2005 | Reynolds | |
| 2006/0072271 | A1 * | 4/2006 | Jones .............. | G06K 19/07758 |
| | | | | 361/93.1 |
| 2006/0129253 | A1 * | 6/2006 | Menas et al. ................... | 700/22 |
| 2007/0242402 | A1 * | 10/2007 | Papallo et al. ................. | 361/63 |
| 2008/0140565 | A1 * | 6/2008 | DeBenedetti .......... | G06Q 20/10 |
| | | | | 705/39 |
| 2008/0150671 | A1 | 6/2008 | Holmstrim | |
| 2008/0291607 | A1 * | 11/2008 | Braunstein et al. .......... | 361/601 |
| 2008/0303353 | A1 | 12/2008 | Liu | |
| 2009/0249002 | A1 * | 10/2009 | Imahara ................. | G05B 15/02 |
| | | | | 711/161 |
| 2009/0265041 | A1 * | 10/2009 | Benjamin ..................... | 700/292 |
| 2010/0292856 | A1 * | 11/2010 | Fujita ..................... | G06Q 10/04 |
| | | | | 700/291 |
| 2011/0087383 | A1 * | 4/2011 | Faulkner .................. | G05B 9/02 |
| | | | | 700/293 |
| 2011/0210739 | A1 | 9/2011 | Cornelis | |
| 2014/0167700 | A1 | 6/2014 | Chen et al. | |
| 2014/0320088 | A1 | 10/2014 | Nysen | |

OTHER PUBLICATIONS

Schneider Electric, "Protection Guide", Jan. 1, 2008, XP-002608938,http://www.engineering.schneider-electric.dk/attachments/ed/guide/protection_guide_mv.pdf.

Wikipedia, "Three-phase electric power", Jun. 1, 2016 [retrieved on Jun. 2, 2016]. Retrieved from the Internet <URL: https://en.wikipedia.org/wiki/Three-phase_electric_power>, 2nd paragraph of "Generation and distribution."

The Free Dictionary, "end user", 2016 [retrieved on Jun. 2, 2016]. Retrieved from the Internet <URL: http://www.thefreedictionary.com/end+user>.

Preve, Christophe "Chapter 10: Protection of Network Elements" Protection of Electrical Networks, 2006.

Skok, Srdjan et al "Applications based on PMU Technology for Improved Power System Utilization", IEEE, 2007.

* cited by examiner

POWER DISTRIBUTION APPARATUS

FIELD OF THE INVENTION

The invention relates to an electrical power distribution apparatus connectible to one or more loads. The invention further relates to a method of electrical power distribution to one or more loads.

BACKGROUND OF THE INVENTION

Modern medical facilities have come to rely these days more and more on dedicated, highly complex medical devices. Such medical devices include imaging equipment such as magnetic resonance imaging (MR) or cardiovascular X-ray systems.

Medical practitioners rely on the imaging material produced by those medical devices. Ensuring smooth operation so that the system can deliver those imaging materials at the required quality level is an objective. When in operation, the medical devices draw electrical power.

Local power stations through their respective power grids supply electrical power. The electrical power supplied is location specific. The power is supplied in certain voltages and amperages at a certain frequency. The medical devices have specific power requirements determinative to the quality of the image material produced by the devices.

Further, in large medical facilities where a large number of those medical devices are run at the same time, the total amount of electrical power required for operation of the devices is considerable.

Recent solutions envisage setting up dedicated power distribution systems arranged between the local power grid and the power consumers such as the medical devices. Current power distribution systems are designed at design time to comply with the local power characteristics.

As the power distribution systems must interface not only with the local power grid but also with a number of different medical devices, vendors must produce highly location specific power distribution systems to have their medical devices supplied with electrical power. The so produced power distribution systems cannot therefore be used easily elsewhere.

SUMMARY OF THE INVENTION

The invention addresses at least parts of the above needs by providing a distribution apparatus that is programmable and configurable. The power distribution apparatus can be tailored to location specific needs on the spot.

The power distribution apparatus, according to the present invention, defines a configurable subsystem within the overall power supply system further comprising at the local power station and the power grid, and the medical devices connectible to the grid by way of the power distribution apparatus.

The power distribution apparatus comprises on top of conventional circuit breakers a number of "soft fuses". The soft fuses are programmable switches and the operation of the soft fuses, that is their switching on and off, is software controlled by way of a control module. The soft fuses may be arranged in solid state technology. The soft fuses are programmable to change the switching time of the soft fuse or a time-current characteristic of the soft fuse.

The control module is in communication with a monitoring module. The monitoring module is programmed and configured to monitor the electrical power signals at the input mains into the power distribution apparatus and at the power taps to which the medical devices are connectible.

In other words, the power distribution apparatus, according to one aspect of the present invention, allows harnessing the information that resides in the supplied electrical power signal itself in order to effect by suitably switching on/off the soft fuses the provision of high quality power signals and to further allow saving energy.

The monitoring capabilities also allow detecting non normal behavior in the system that would normally lead with high likelihood to the tripping of the conventional circuit breakers. A plurality of soft fuse switches provide a second layer on top of the existing circuit breaker switches in order to prevent conditions in the system that may lead to the conventional circuit breakers to trip. By switching off the power taps at a point of time before the conventional circuit breaker would trip, an otherwise necessary calling in of a service technician may therefore be avoided and procedure or mission critical equipment can remain in operation.

According to another aspect of the present invention, the control module is arranged according to a distributed architecture. The control module in this case is arranged as a master control module and a as a number of slave control modules. The one or more slave control modules are arranged to receive configuration commands from the master control. The commands so received are suitable to effect re-programming any one of the slave modules or to re-program any one of the fuses associated with any one of the one or more slave controllers. The slave and/or the master control modules and/or the fuses are programmable or re-programmable during operation of the power distribution apparatus.

According to one aspect of the present invention, the mains transformer together with the master controller is arranged in a power distribution unit base module physically separate from a number of power distribution unit extension modules in which the respective slave controllers along with the respective tap or group of taps are located. This distributed architecture adds flexibility because of the high degree of modularity. The master control module as well as the slave control modules is programmable.

By having a monitoring module monitor the wave signals of the supplied amperage and voltages at the taps, idle states, non normal behavior, etc. of the connected medical devices at the power taps can be detected. In response to such a detection, control commands are issued from the respective slave or master controller and the respective power tap is switched on or off so as to control the distribution of the available electrical power in a manner that is economical and ensures good up-time characteristics of the connected devices.

Furthermore, the distributed arrangement of the slave controllers allows supplying group specific power to the groups of taps arranged at respective ones of the power distribution unit extension modules. Cables run from the power distribution unit to the power distribution extension modules can therefore be adapted to the specific power needs. The subsequent distribution of the total available power to the switchable taps is effected locally by the slave controller at the respective power distribution unit (PDU) extension module.

In other words, the power distribution apparatus comprises a single base unit that takes care of the mains power adaptation and then distributes the mains power to the PDU extensions modules that are located nearby the consumers. Only a single mains cable is run between the PDU base unit and any one of the PDU extensions modules at the remote locations. Expensive high rate wiring may therefore not be needed in all circumstances.

According to another aspect, the apparatus implements a distributed and modular power distribution further including a "fourth phase" supply by an uninterruptible power supply.

According to one aspect of the present invention, the monitoring module is further arranged to monitor the voltage or amperage at the mains input. This allows implementing defined power supply switch off procedures in the event of a power outage. If the uninterruptible power supply approaches a drained state, the fuses are switched off in a prioritized sequence according to a list. The list holds IDs of the loads deemed mission critical. The IDs in the list are arranged according to their priority. The master controller scans the list and disconnects the loads one by one. Mission critical loads having a higher priority are disconnected from the back-up power supply later than mission critical loads having a lower priority.

According to one aspect of the present invention, the control module is arranged to split a 3-phase power signal at the mains input into three single ones, so as to supply ones of the connectable loads with the single phase power signals so obtained.

According to one aspect of the present invention, based on the monitored amperages and voltages, the total load connected is load-balanced across the three input phases.

Definitions

The term "distributed" refers to the notion that the medical devices such as CV or MR comprise sub-units associated with devices, referred to as "power consumers" of the device, the sometimes numerous power consumers being physically distributed across a medical facility and arranged in a particular constellation in an examination room, control room or technical room. The term also includes the physical distribution of the medical devices themselves across the facility. The distributed architecture of the power distribution apparatus reflects this "distributed" constellation at the location of deployment, in this case the medical facility.

The term "controlling the distribution of the electrical power" is to be construed broadly. The term includes:
budgeting or allocating the total electrical power available for supply to the medical devices and
ensuring:
that the power so distributed complies to certain quality standard and
smooth operation of the one or more medical devices connected and
stability and availability ("good up time") of the one or more medical devices connected.

Therefore, according to the invention, "controlling the distribution of the electrical power" entails supplying power to the connected devices in manner to prevent power related damage and the then inevitable tripping of the hard fuse in the first place.

The operation of switching on/off the taps by using the operation of switching off the soft fuses to "control the distribution of the electrical power" is therefore upstream in relation to the operation of switching off the hard fuse (circuit breakers), the hard fuses being installed to ward off imminent damage to the connected loads (medical devices). However, and very much unlike the soft fuses, the hard fuses ("circuit breaker"), once tripped, require manual intervention by a service technician to be switched back on again. In contrast, the soft fuse can be switched off and on by the control module. The soft fuse therefore does not require manual intervention, neither for its being switched on or off. The soft fuse are not installed to primarily ward off imminent damage to the connected medical devices but to ensure long term smooth operation of the connected medical devices.

Throughout the specification, switching "off" a tap, fuse or breaker is to mean that no current can pass, whereas switching "on" a tap or the soft fuse means that current can pass.

The term operator is a human operator using the medical device. The operator may be a radiologist or other physician.

The term medical system includes the PDU and the one or more medical devices connectible to the power distribution apparatus for supplying those devices with electrical power.

The term "medical system controller" is used to refer to the local PC (personal computer) host system that is used by an operator, for example a physician or radiologist, to locally control the medical device. This reflects the fact that medical devices these days are computerized systems in themselves.

The term "medical system software" denotes the software application run on the medical system controller. The medical system software typically controls a number of user interfaces and allows the operator to operate the medical device.

"Switching on/off the fuses" may also be taken to mean "switching on/off" the taps associated with the respective ones of the soft fuses. Further, "switching on/off the taps" may also be taken to mean switching on/off the power supplied at the loads connected to the switched on/off taps.

BRIEF DESCRIPTION OF THE FIGURES

For a better understanding of the present invention, reference may be had, by way of example only, to the accompanying diagrammatic and schematic drawings, which are not to scale, in which.

DETAILED DESCRIPTION OF THE INVENTION

Figure 1:
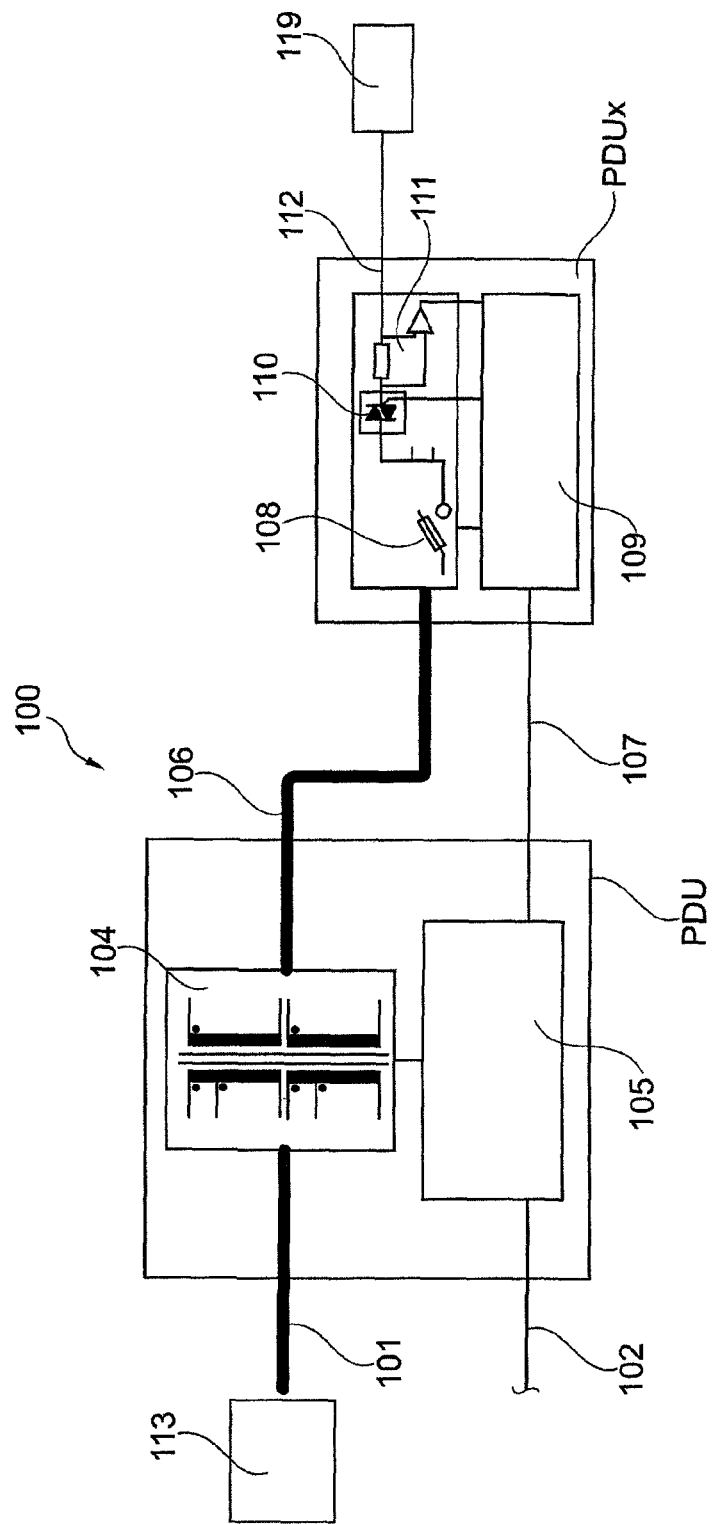
FIG. 1 is a schematic block diagram of the power distribution apparatus, according to one aspect of the present invention.

Reference is now made to FIG. 1 showing a power distribution apparatus 100. The power distribution apparatus 100 may be used in large medical facilities, such as large hospitals or medical centers, having a number of examination rooms. In the examination rooms, medical devices such as medical imaging equipment modality, for example, MRI systems or cardiovascular X-ray systems are placed. The medical devices represent loads 119 that are connectible to a power station 113 providing electrical power. Such connection or 'hook up' of the medical devices 119 to the local power station 113 can be achieved efficiently and safely by way of the power distribution apparatus 100. In the following, the terms load(s) and medical device(s) will be used interchangeably and both will be referenced using the same reference numeral '119.' Further examples of the loads 119 in a medical context may include large X-ray system drawing vast currents but also at the other end of the power spectrum small chargeable ultrasound handhelds.

The term loads 119 or medical device 119 may also refer to individual electrical components of one and the same medical imaging modality.

However, the skilled artisan will appreciate that the principles underlying the operation of the power distribution apparatus 100 are equally applicable to other power consumers. Supplying with electrical power a plurality of household appliances and music reproduction equipment in homes may be another example.

Other fields of application may include electronic test equipment in manufacturing plants.

The power distribution apparatus 100 comprises a power distribution unit base module PDU. The power distribution unit base module PDU will be simply referred to in the following as PDU. The PDU has a mains input 101. By way of the mains input 101, the electrical power generated at the station 113 is received and fed into the PDU via a local power grid. The electrical power provided has location specific power characteristics, such as a specific voltage and amperage at a specific frequency. The power is either a single phase signal or a 3-phase signal with or without neutral. The PDU further comprises a mains transformer 104. At install time, a chosen maximum power level is chosen for the mains transformer 104. At install time the mains transformer 104 is configured to take in variable input and to provide a fixed output configuration. The mains transformer 104 may be replaced by a short-circuit to implement an "abstract transformer", if the local power received from the power station 113 at the mains input 101 happens to comply with the output requirements to be supplied at power taps 112 and to the medical devices connected to the taps 112. The maximum output current at the taps is around 16 A per phase. The maximum power rating is 3.times.63 A nominal power, but in other fields of application other ratings may be contemplated.

The PDU further comprises a master controller 105, which is arranged as a programmable microcontroller such as an FPGA (field-programmable gate array) or flash programmable controller. The mains transformer 104 has primary and secondary coils for transforming the electrical power received via the mains input 101. Electrical power is transformed in order to make the power comply with individual power requirements of the individual medical devices 119 connectible to the PDU. The transformed electrical power is fed from the PDU into a power cable 106 and is then applied unto one or more of the power taps 112 (only one power tap 112 is shown in FIG. 1). Unlike the diagrammatic representation in FIG. 1, in reality, there may be a number of cables 106 run from the PDU to the respective power taps 112 or to individual groups of power taps.

The length and diameter of the one (or more) cable 106 is chosen such to have a known acceptable dynamic voltage drop behavior.

The power taps 112 are connectible to electrical sockets to which in turn the devices 119 can be connected. The one or more power taps 112 may be thought to be physically located in the examination room. The tap 112 supplies with electrical power not only the device 119 but also other electrical devices associated with the respective medical device 119. Because the one or more power taps 112 may be positioned close to the medical devices, the one or more power taps 112 naturally define groups of taps throughout the medical facility. The taps 112 or groups of taps are to supply electrical power compliant with the specific power requirements of the medical devices connectible to the tap 112 or the taps in that group.

However, in other scenarios, there may be of course more than one group of taps per examination room. In yet other scenarios, the groups of taps may be formed without reference to any (examination-) room or other building structure. For example, if the medical devices 119 are components of a single one imaging equipment modality, the groups of taps are formed by arranging the tap 112 or the groups in suitably compartments or other suitable locations throughout the racks, housings or cabinets of that single imaging equipment modality.

The medical devices 119 and/or the electrical devices associated with the medical devices have assigned IDs. The programmable master controller 105 knows those IDs. Master controller 105 is programmed and configured to tap-off from the mains transformer 104 the specific power required by the devices 119 connected to the power taps 112 or groups of power taps.

The programmable master controller 105 has a memory and/or is programmed to connect to an external database. In the memory or the external database are stored tabular data structures that associate each of the IDs of the medical devices 119 with the respective power requirements. In this way, tap 112 or group (of taps) specific power distribution can be effected.

The master controller 105 has an Ethernet connection 102. By way of this Ethernet connection device, a medical system controller or service technician can hook up to the master controller 105.

The medical system software or a technician can then execute the necessary programming or re-programming of the master controller 105. Such re-programming may be necessary if more taps are to be connected to the PDU. The power distribution unit 100 is hence arranged in a scalable manner as it allows adding or topping up an existing system with further taps. The Ethernet connection 102 may be a wireless connection or a conventional landline.

According to one aspect, the PDU has a user interface that allows the service technician to program the master controller 105. The PDU therefore allows on the spot manual configuration or remote and automatic configuration by the medical system controller via the Ethernet connection 102. In other words, the PDU may be used with or without a medical system controller. Once the PDU is configured by suitably programming the master controller 105, the PDU may operate autonomously without using the communication line 102.

The master controller 105 may also be arranged and configured to execute automatic hardware recognition. In this case hooking up more power taps and/or further medical devices to the PDU would not necessitate intervention of the service technician. For presence detection purposes, the added medical device is arranged to send its ID either via the cable 106 or via a bus 107 to the master controller 105. Programming the master controller 105 may occur during run time or operation of the distribution apparatus 100. The automatic Hardware configuration detection is at boot time or via command forced discovery.

According to another aspect, the apparatus 100 may be assembled based on configuration part numbers and serial numbers for all the powered devices 119. This configuration knowledge can be used to automatically set up the PDU configuration at initial startup via a database interaction with the medical system, This allows reducing service man hours for carrying out the configuration of the medical system.

The master controller 105 is also in charge of allocating or budgeting the total amount of electrical power available. The budgeting is to ensure that the sum of the electrical power supplied via one or more of the taps 112 not to exceed the total electrical power coming from the mains input 101.

The master controller has stored thereon information about the rating of the mains transformer 104. This allows easy, stepwise scalability of the power distribution apparatus 100. Changing for a different transformer having a different rating then merely amounts to (re-)programming the new transformer rating into the master controller 105.

According to a preferred aspect of the present invention, the power distribution apparatus 100 further comprises power distribution extension modules PDUx. The power distribution unit extension module PDUx will simply be referred to in the following as PDUx.

The PDU as well as the PDUx are arranged as physically separate racks or units having mounting brackets for safe installment. The PDUx are physically distributed across the medical facilities and each of the PDUx may be installed in a different examination room. The PDUx may also be installed in or at the cabinet of (one of) the medical device(s) 119, if the medical devices are electrical components of a single medical imaging equipment. There is one PDUx per power cable 106. The Taps 112 or the groups of taps 112 are physically located in or at the respective PDUx. The Cable 106 is run from the PDU to each of the PDUx positioned in the respective rooms or in the cabinet.

Each PDUx has a slave controller 109, which is a programmable microcontroller similar to the master controller 105. The bus system 107 is arranged to communicatively couple each of the slave controllers 109 with the master controller 105. The programming of the controller 109 and the run time control is effected by way of data interchange over the bus 107.

The slave controller 109 is programmable and re-programmed by routines stored on the microcontroller 105. Each of the slave controllers 109 is configured to control the local power distribution at the respective tap 112 or group of taps 112 associated with the respective PDUx.

For safety purposes and to protect the medical devices 119 connected to each one of the PDUx, there is arranged a circuit breaker or "hard fuse" 108 between the cable 106 feeding into the PDUx and the power tap 112 or the groups of power taps. The hard fuse 108 has a hard wired trip value rating which protects the medical devices 119 from damage.

Due to malfunctioning, the medical device may start drawing excess current or the device may exhibit different load characteristics during startup or operation. In response to the different load characteristics, the circuit breaker or hard fuse 108 trips and hence switches off the power supply to the power tap 112 and ultimately to the faulty medical device connected thereto. If so desired, the PDU can issue service request commands.

Between the circuit breaker 108 and the tap 112 or the group of taps, there is arranged an on/off switchable power switch, referred hereto also as "soft fuse" 110. The soft fuse 110 is as switch in solid state technology, such as a thyristor or an IGBT (insulated gate bipolar transistor). The soft fuse 110 is responsive to control commands issued from the slave controller 109 or from the master controller 105. The issued command is a "switch on" or a "switch off" for the soft fuse 110. Whether the command is switch on or off depends on a power characteristic of the electrical power supplied at the respective tap 112 or at the respective group of taps. In respect to the monitored signals, the slave controller 109 is programmed and configured as an event handler.

Between the soft fuse 110 and the tap 112 there is arranged a probe or sensor in communication with a real time monitoring module 111. The real time monitoring module 111 monitors a voltage or amperage wave signal associated with the supplied electrical power at that tap 112. The monitoring module samples at about 1 ms but the sampling rate may be configurable. According to another aspect, the wave signals may also be monitored at other internal distribution points. The wave signals, that is the amperage versus time wave or the voltage versus time wave, are then each converted into a digital signal and back-loop fed into the slave controller 109 or are relayed to the master controller 105. In the respective slave controller a comparator compares the monitored signal against pre-set but re-programmable control threshold values or ranges (having lower and/or upper limits) for each of the of the threshold values. Using ranges of intervals prevents non-deterministic behavior of medical system components because of invalid mains quality.

If either the monitored amperage or voltage or a combination thereof exceeds the pre-set control threshold for a pre-set period, the slave controller 109 issues a switch-off command to the respective power tab 112. The controller 109 is in communication with a driver suitable to effect the switching off or on of the solid state technology soft fuse 110. Using solid state electronics for the tap switch 110, makes manual re-setting or switching back on the switched off switch 110 unnecessary. In other words, in dependence on the monitored signals the slave controller 109 is arranged not only to switch off but also to switch back on the tap switches 110 or each of the tap switches 110 in the respective groups associated with the respective PDUx. The switching on or off of the soft fuses 110 is controlled in such a manner so as to avoid tripping (switching off) of the preceding circuit breaker 108. The objective of good uptime characteristics of the medical devices 119 can be furthered without compromising safety. Implementation of the hard fuses 108 as expensive manually re-setable circuit breakers is not necessary.

In contrast to the hard fuses 108, the tap switches or soft fuses 110 are not switched to protect the connected medical devices against imminent damage. Switching on or off of the tap switches 112 is chiefly for the purpose of locally controlling the power distribution, to carry into effect power saving objectives as well as to ensure a defined quality of the electrical power supplied locally at the local power taps 112. Ensuring a defined power signal quality allows reliable operation of the connected medical devices 119 and that the devices 119 produce their output (imaging material) at expected quality standards. In short, the switching by means of the soft fuses 110 is to ensure that the connected medical devices 119 are functioning properly (are "uptime") for as long a period as possible. In particular, imaging equipment is adversely effected by "rippled" power signals having peaks, surges, dips, incidents etc. or other such "signal singularities". High power signal quality is ensured by only switching back on the soft fuses 110 if the signal singularities in the supplied power signal are bounded by the configurable control threshold values or ranges. Group specific ones of the power characteristic threshold values are stored in the respective master controller 105 or slave controller 109.

According to another aspect, the PDU has an emergency stop button. The soft fuses 110 or a pre-select group of soft fuses are responsive to emergency signals issued upon operation of the emergency control button. Upon issuance of the emergency signal the master controller 105 forwards a switch off command to the respective soft fuses 110 or groups thereof. The emergency stop button allows an operator switching off the medical devices 119 connected to respective taps 112. The soft emergency button is futher arranged to issue a "switch on" command to switch back on the previously switched off soft fuses 110 and the medical devices 119 connected thereto. In other words, the emergency button allows the operator not only switch off the respective fuses 110 and respective taps 112 but to switch them back on again should he decide that such switching back on is adequate. Switching off the hard fuse 108 is thereby not needed in certain cases and calling in the service technician will not be necessary to resume operation of the switched off medical device 119. Whether or not a soft fuse is response to such an emergency signal is per-programmed in the master control 105. Therefore, suitably programming the master controller 105 allows defining the group of fuses 110 responsive to the emergency signal.

The medical devices 119 are highly sensitive devices and operation of those devices may not be satisfactory unless the provided electrical power signal is known to be sufficiently free from signal singularities. In other words, the waveform of the power signal must be smooth enough. Power surges may most notably occur when the medical device 119 is booted, the boot process being initiated by the operator at the medical device 119.

Ensuring smooth power signals at the respective taps 112 may be effected as follows. The slave controller 109 may be programmed to pick up zero crossings in the monitored wave signal. The switching-on signal to the power tap 112 is delayed until such a zero crossing is detected. Therefore, even though the operator boots the system locally 119 a delay may occur because the power is switched through at tap switch 110 only if the slave controller 109 establishes that the quality of the supplied power signal is sufficient. After the operator initiated booting of the medical system, the loads 119 may be powered up by sequentially switching on the previously switched off taps 112 to effect time delayed switching on each one of the connected loads 119. By way of monitoring the waveforms at the tabs 112, power savings can also be effected by idle state detection of the connected medical device 119. The current, voltage and power consumption may not only be monitored by the real time monitoring modules 111 at each one of the taps 112 (or at a selection of the taps 112), but also at the mains input 101. The quality of the power signal at the mains input 101 is switched through at the taps 112 only if the quality of the power signal is good enough as measured for example in terms of the power factor ("cos phi").

The control threshold values used to control the power taps 112 can be anywhere within the range of the minimum voltage required to properly operate the device 119 and the maximum allowable voltage at which the conventional circuit breaker for safety purposes 108 would trip. The overall distribution or allocation of the total electric power available is controlled by the master controller 105 in the PDU. The controlling for the purposes of saving energy at the respective taps 112 and/or supplying the electric power at a group specific quality is controlled by the local slave controller 109 based on pre-programmed settings received earlier at the slave controller 109 from the master controller 105.

The wiring within the PDUx can be adapted to the specific local power requirements as the electrical power coming from the cable 106 has already been adapted to the specific needs of the respective tap 112 or groups of taps by way of the master controller 105. A power distribution control task for the purposes of energy efficiency and power saving can be executed by the master controller according to a simple schedule programmed into the memory of the slave controller 109. The power to the respective taps 112 are therefore switched on or off in accordance with the local schedule stored in the slave controller's 109 memory. In this manner, an auto wake-up timer may be put into effect. The auto wake-up timer saves startup time at workday or prepares the respective medical device 119 for quick emergency use via remote trigger, received over the Ethernet connection 102. The trigger signal has the ID of the medical device 119 and is routed by the master controller 105 and relayed to the respective slave controller 109 to have the switch on command issued to the respective tap 110 to power up the needed medical device 119. The switching on/off the taps 112 may also be triggered by other events, i.e., temperature readings. To this end, suitable transducers are arranged in communication with the slave controller 109 and positioned at or in vicinity of the medical devices 119 or at other measuring points within the power distribution apparatus 100.

According to another aspect of the present invention, during an initial learning phase, the real time monitoring module 111 is arranged to monitor the actual power usage at the taps 112. The so monitored power usage is then stored as time series of the amperages and voltages. In this way, reference data indicative to normal operation of the medical device 119 connected to that tap can be obtained. The reference data ("base line") may be obtained shortly after installation and setting up of the power distribution apparatus 100 at the locality. If a sufficient amount of reference data has been acquired, certain threshold values can be defined so that a deviation from this reference data can be established as a defined significance level. The monitoring device keeps then monitoring during normal operation the amperage versus time waves and or the voltage versus time waves. If a deviation between the so monitored wave signals and the reference data is detected to exceed the threshold value, the slave control 109 issues a switch-off command to the respective switch 112 and/or issue a service request command.

According to another aspect, the power monitoring executed by the real time monitoring module 111 is configurable with respect to integration time. Integration over the sampled amperage or voltage values may be taken per second, per minute or per hour to obtain the power consumption values. The monitored values are aggregated into the respective power consumption value and the individual sampling values so aggregated can then be discarded. This way the cyclic power monitoring memory at the real time monitoring module 111 is prevented from overflowing, For the purposes of long term data, for example when acquiring the "base line" data mentioned earlier, it may be sufficient to integrate the sampled values a period of for example an hour. However, if data in relation to power up events are to be recorded, the sampled values may be integrated throughout a period around the occurrence of the power up event, the period being taken in seconds or less.

The slave controller 109 may also be programmed to compare the monitored power signals against power consumption characteristics of the loads 119 connected to the tap 112 associated with the slave controller 105. The power consumption characteristics may be provided by the vendor and are stored in the memory of the slave controller 105. The power consumption characteristics is associated with the ID of the device 119 connected to the respective tap 112. By comparing the monitored signals against the stored power consumption characteristics a degradation of the device before actual failure may be detected. A suitable switching on and off by way of the soft fuses 110 may then delay the point of failure just before the next scheduled maintenance.

A costly ad hoc calling in of the service technician to service only that particular ailing device may then be avoided.

Acquiring the reference data ("installation base-line") suitable for making such a determination as to normal or non normal operation of the connected medical devices may be thought of as a learning phase of the power distribution apparatus 100. In a similar manner trend watching and trip event capturing in relation to the hard fuses 108 can be effected.

Slave controllers 109 may also be programmed to automatically issue based on the baseline reference data informed maintenance messages ("advices") to a service technician's computer via the Ethernet connection 102.

The advices may include:

Load balance advice based on load per phase during typical or learned user behavior. This allows more balanced loading of the 3-phase mains network to ensure higher mains network quality.

Total earth leakage current minimization configuration advice for the distribution of load. This allows higher medical safety level or use of better EMC (electromagnetic compatibility) filtering at the same medical safety level.

Master and Slave controllers 105 and 109 may also be programmed to control switching on/off the soft fuses 110 to effect inrush current optimization. In a learning phase, during switching on/off the taps 112 by way of the soft fuse 110, the actual inrush current-time wave of the connected loads 119 is monitored and stored. At subsequent switching events, the current-time wave so stored is then used to determine a synchronized switching on/off of the soft fuses 110 at the respective output taps 112 so as to minimize the maximum inrush current at any time instance during system boot. This allows for higher reliability, less mains network disturbance and higher stability of mains voltage during switching.

The master controller 105 in the PDU and/or the slave controllers 109 in the PDUx may also be arranged so as to effect splitting of the power signal in case the mains electrical power signal is a multi phase signal. The electrical power at certain ones of the taps 112 in the respective group or all of the taps may then be supplied as single phase, should the medical device connectible thereto have such a requirement. This allows setting up a controllable 3-phase output awareness of the power distribution system 100. For 3-phase consumers, three independent single phase outputs are used. The three single phases are still treated as a single 3-phase output by the controller 109, i.e., they are switched on/off simultaneously, they have the same power characteristics, and they are still monitored by monitoring module 111 as 3-phase.

According to another aspect, the master controller 105 is programmed to load-balance, across the three input phases, the total load currently connected to the taps 112. This allows providing a maximum load power quality and minimum disturbance from the input mains 101 to the power grid. The load-balancing is based on the load power characteristics, that is, the monitored amperages and/or voltage at the tap 112. The optimization is in view of any one or combination of the following criteria: earth leakage and/or harmonics. The various loads 119, each having their particular load power characteristics, may then be distributed amongst the three mains phases to that a vector wise addition of the earth leakage and/or harmonics is minimized.

To sum up, controlling the tap switches 112, that is using the fuses 110 to switching them on/off in response to and in dependence on the monitor to the power signal allows fully software controlled flexibility for distributing in a quality controlled manner the total available power available the PDU throughout the medical system.

According to another aspect of the invention, the tap switches 110 themselves are programmable devices. The rating switching characteristics such as fast and slow switching and current-time characteristics (linear, exponential, etc) during switching can be re-adjusted (dynamic source impedance).

Reprogramming the soft fuse 110 to act as a fast or slow blow switch may occur during runtime of the power distribution apparatus 100. A dynamic switch behavior of the soft fuses 110 can also be effected. A fast switch allows switching time in the order of 0.01 s and a slow blow switch can be as slow as 2000 s if the current is less than twice the threshold. After the threshold level has been exceeded for the programmed time (0.01-2000 s), the actual switching sequence starts.

During a time-controlled switching operation, the programmable soft fuse 110 gradually increases or decreases the current from a threshold amperage that triggers the switching operation up to or down to a desired amperage. Switching on or off the soft fuses 110 by gradually increasing or decreasing the current allows implementing control over the actual switch on/off behavior and prevents undesired distortions on the mains output. Further, the time between detection of an exceeding of the threshold and the actual start of the switching is dependent on the degree at which the monitored amperages or voltages deviate from the "base line" power consumption characteristic mentioned earlier. If the deviation is found to be severe, the associated slave controller issues commands to effect reprogramming of the respective soft fuse 110 into a fast triggered switch. Otherwise, a slow triggered switch may be sufficient to bring down the current at the tap 112 where the presumably ailing load 119 is connected.

Having the soft fuses 110 arranged as programmable switches adds yet another degree of configurability and flexibility to the overall system, because this allows better budgeting of the total available maximum power and making such power available for adding permanent or non-permanent further equipment to existing or new power taps.

Because of the system's ability to detect non-normal behavior, as mentioned earlier, the operation of switching off the soft fuses 110 may occur prior to switching off the power supply by way of the hard fuses 108. Calling in a service technician to switch back on the hard fuse 108 after it tripped or has blown may therefore be obviated. Uptime of the system can therefore be improved resulting in more efficient operation of the system.

In all, the power distribution apparatus 100 comprising the PDU and the PDUx defines a freely configurable sub-system within the larger medical system, the larger medical system further comprising the medical devices 119 connectible thereto and the power station 113 providing the electrical power to be distributed. The system can be programmed, re-programmed and/or configured not only at design time but at run time, on the spot and can be tailored to specific local needs. Another degree of flexibility is added because of the distributed architecture of the power distribution apparatus 100 comprising the PDU with the master controller 105 being arranged in or at the PDU and a number of PDUx with the slave controllers 109 arranged in or at the respective PDUx—the power requirements can be configured down to the level of each individual tap or groups of taps.

Figure 2:
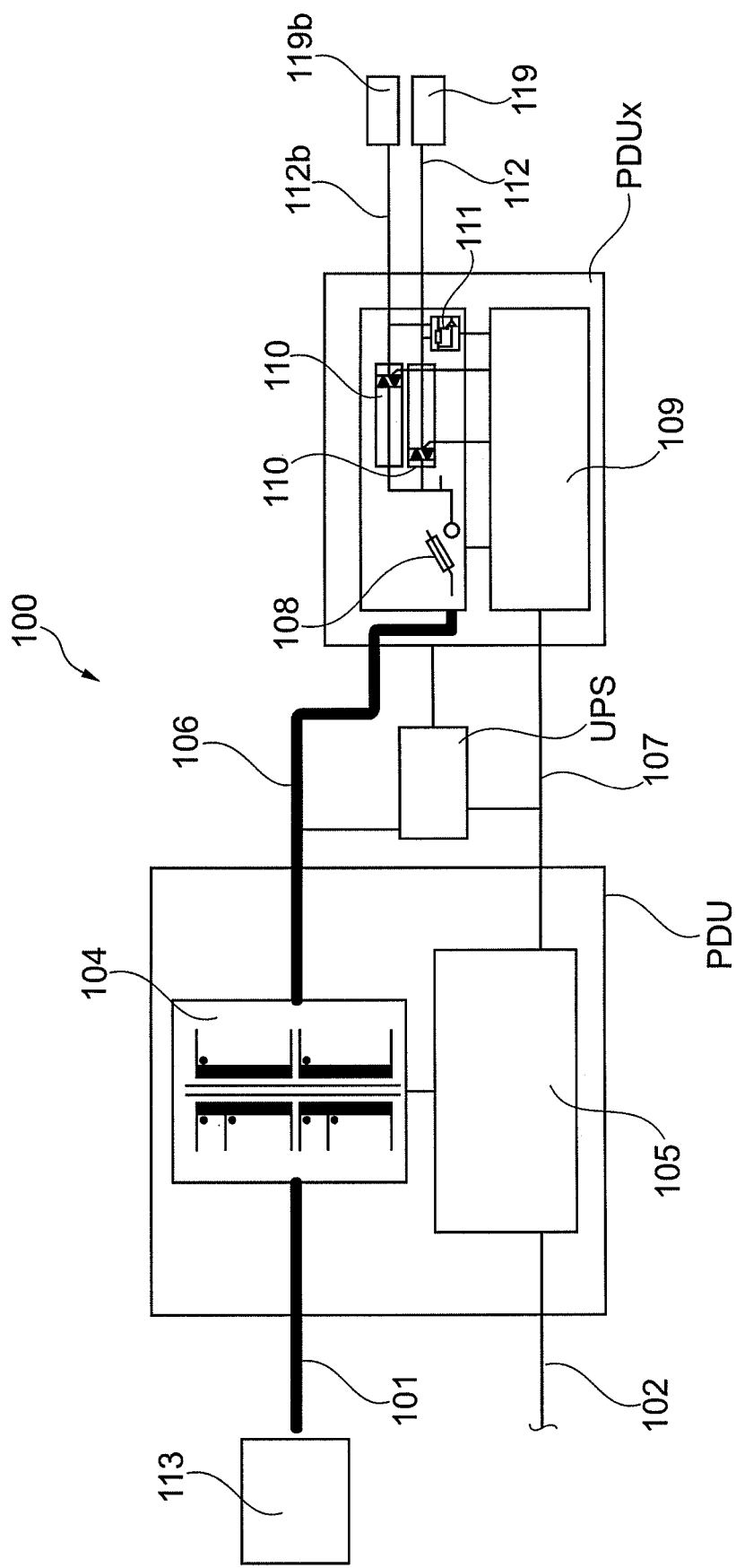
FIG. 2 is a schematic block diagram of a power distribution apparatus, according to another aspect of the present invention.

FIG. 2 shows the power distribution apparatus 100 having further arranged therein an uninterruptible power source UPS. The uninterruptible power source will be referred to in the following as UPS. The UPS is arranged as a programmable module and is in communication with the slave controllers 109 and the master controllers 105 via the bus system 107. The UPS is arranged to provide a virtual 'fourth phase' in each of the PDUx. The UPS may include a suitably dimensioned battery module. The term "fourth phase" refers to a configurable phase backed-up by the UPS. The fourth phase is used to supply power via the dedicated output tabs 112b to devices 119b deemed mission critical in the event of power outage The master controller 105 is arranged to control and monitor the capacity of the UPS and consumption of power supplied by the UPS. The medical system or a service technician by way of the Ethernet connection 102 may then remote analyze the monitored capacity and consumption of power from the UPS to decide whether the current capacity requirements need to be redefined. The UPS is daisy chained between UPS and the PDUx. The UPS is charged during normal operation of the power distribution apparatus 100 by way of a feed line branching off from the cable 106. Electrical power is supplied via the hard fuse 108 and dedicated soft fuses 110b to dedicated power taps 112b. Dedicated soft fuse 110b and the respective power tap 112b are arranged in addition to the fuses 110 and tap 112, referred to in FIG. 1. The medical devices 119b connectible to the dedicated power tap 112b are considered mission critical. In case of an outage the UPS supplies the mission critical medical devices 119b connected to those dedicated power taps 112b with the much needed power for a period determined by the capacity of the UPS.

In a medical environment, cooling units for MR systems or X-ray tubes or buffering systems storing examination data that has not yet been saved are examples of such mission critical systems. Not supplying the cooling unit with back up supply from the UPS may lead to expensive helium escaping from safety valves or may even lead to the irreparably damaging of expensive X-ray tubes because of the thermal energy generated prior to the power outage. In the later case the patient may need to be examined because of the data loss, making another round of examination necessary.

Further, imaging equipment may need to undergo a certain warm up period after the outage. During the warm up period the imaging equipment cannot be used to acquire images. Therefore, having the UPS in place may render it unnecessary for the system to undergo the warm up procedure. The capacity of the UPS is tuned to the requirements of the mission critical medical devices 119b. In order to provide a defined back up energy supply, standardized battery equipment is contemplated for use in the UPS. Because of the modularity of the power distribution apparatus 100, the UPS may be easily changed so as to adjust the required capacity. In case of outage, the UPS is controlled by the master controller 105 and the respective slave controller 109 in order to allocate the total available back up power and to spread this power across all the mission critical medical devices 119b connected to the dedicated taps 112b.

The monitoring module is arranged to monitor the electric power supplied by the UPS in case of an outage. The interaction between the monitoring module 111 and the slave controller 109 at the respective PDUx is completely analogous to what has been said earlier with respect to FIG. 1. In other words, the same power saving and quality of the electrical power is ensured no matter whether the electrical power comes from the UPS or from the PDU's main input 101.

Furthermore the monitoring module 111 in FIG. 1 or in FIG. 2 is arranged to monitor the electrical power signal at the mains input 101. By monitoring the power signal at the input mains, the following graceful degradation scheme can be implemented in case an outage is detected. The master controller 105 and the respective slave controllers 109 have stored thereon priority lists. In one of the priority lists the IDs of power taps 112 are listed to which non mission critical medical devices 119 are connected. According to this list, in case of an outage, power supply at the power taps 112 are switched off by way of the soft fuses 110 in a sequential manner defined by the list. The sequential switching off is executed such that taps 112 having a higher priority on the list will be switched off later than taps 112 having a lower priority. In other words, the position within the list defines grace periods throughout which, even though an outage has been detected, the respective power tap 112 is still supplied with electric power.

There is also a second priority list of those power taps 112b deemed mission critical. In a similar manner, in case of an outage, the power supply is taken over by the UPS and if the current supplied by the UPS drops below a defined threshold, the mission critical power taps 112b are switched off in accord with their position on the second priority list. In other words, even during power outage conditions, the system can be shut down in a defined manner in order to make it easier for the system to be powered up later on.

The master controller 105 and/or the slave controller 109 may also be programmed to effect the following features:

Execution of automatic V-I (Voltage (V)-Current (I)) sensor self-calibration routines during startup of the PDU based on tabled references values embedded in the circuitry of the master controller 105 or the slave controller 109. This prevents de-rating of the circuit breaker 108 due to temperature effects and improves accuracy.

Total power budget monitoring and the switching on/off the soft fuses 110 is further based on auto detected PDU configuration. In a "sanity check" actually monitored power consumption at the taps 112 is compared with a priori known power consumption characteristics stored in the memory of the master and/or slave controllers 105,109. The power consumption characteristics may be provided by certain vendors whose equipment has be authorised to be connectible to the PDU. This allows detecting whether tampering has occurred, that is, whether equipment from non-authorized vendors has been connected to the PDU, because such equipment is likely to have power characteristics different from those pre-stored in the controller 105,109 memory.

Controlling an isolated, general purpose 3-phase power rail switch (not sown in FIG. 1 or FIG. 2.). This enables bypassing the PDU and to establish a direct connection of heavy loads to the hospital mains 110. In this bypass case, the heavy load is connected via one of the main cables 106 to the general purpose 3-phase power rail switch and from there direct to the mains input 101. The master controller 105 and/or the respective slaver controller 109 are programmed to auto-detect such a bypass connection. The control functionality of the controllers 105, 109 by way of switching on/off the fuses 110 (and hence the tap 112) is therefore still available, not matter whether the power is supplied via the transformer 104 or via the bypass connection established over the general purpose 3-phase power rail switch. By maintaining the control functionality over the power supplied by way of the bypass connection, earth loops can be prevented.

Further summarizing the features of the power distribution apparatus 100:

The output taps 112 can be added after install-time to the PDU or to the PDUx.

Each output tap 112 is production- install- and rum-time configurable. This configurability consists of a combination of manual configuration for settings that are needed ones and automated software controlled configuration based on detection of the PDUx connected. In the same vein the (optional) UPS, an isolation transformer and filters may be added-on at a later stage after design or install time.

The power distribution apparatus 100 allows free software-controlled (re-)allocation of the total available power across the connected loads 119.

Because of the modular arrangement in PDU and a plurality of PDUx, fewer mains cable 106 are needed and EMC (electromagnetic compatibility) phenomena such as cross-talk can be avoided.

The master controller 105 and the slave controller 109, by using the information from the power signals monitored at the taps 112, effect software-implemented power saving via, eg, idle state detection and in response thereto effecting automated switch off of non-utilized medical devices 119 and or their associated consumers. The controllers 105,109 may further provide user advise in form of maintenance messages issued for reception by service personal computers.

Figure 3:
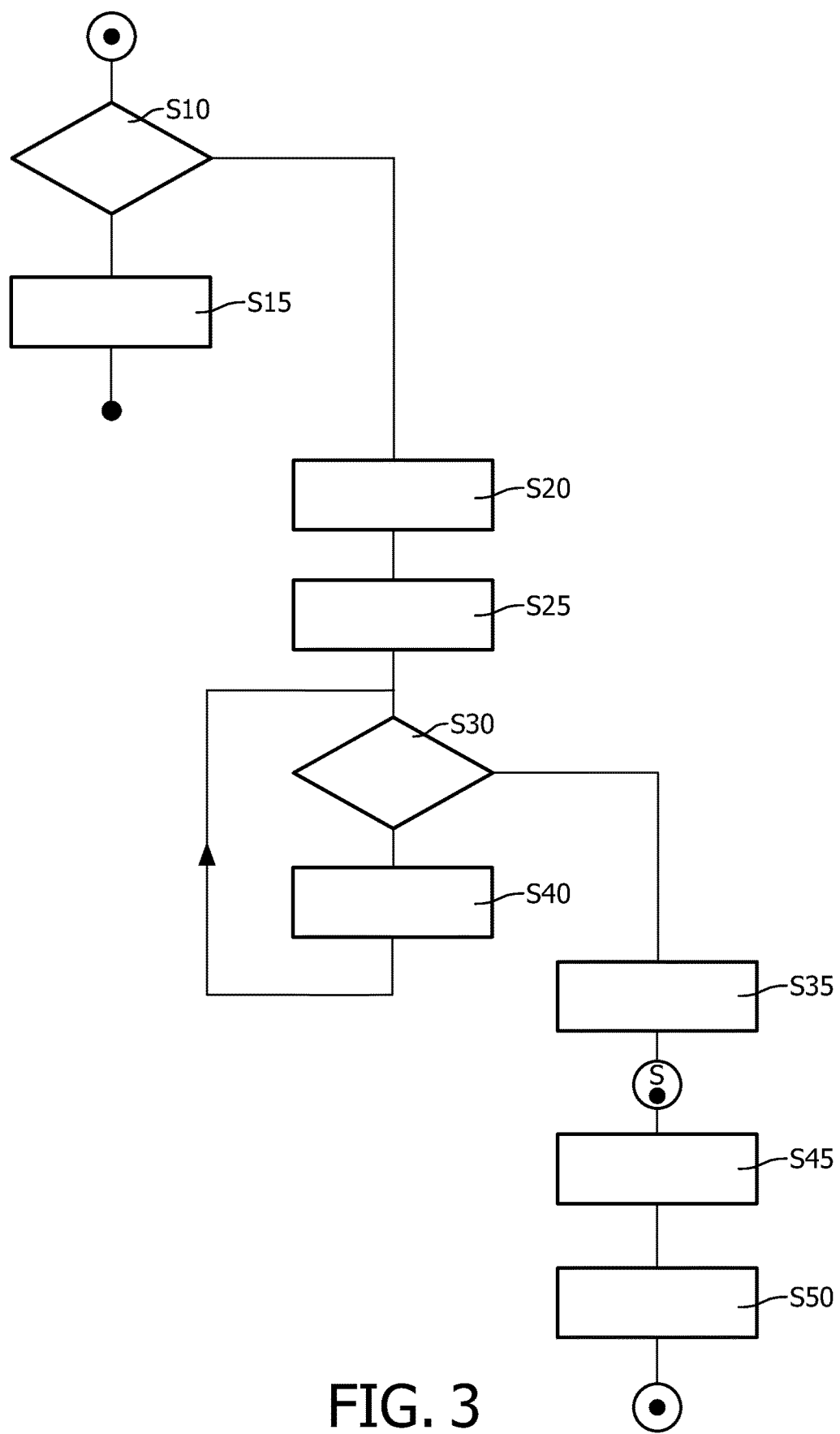
FIG. 3 is a flow chart for a method of power distribution.

Reference is now made to FIG. 3 showing a basic flow chart of a method of distributing electrical power coming from a power supply to one or more loads.

In a first step S10, it is determined whether the voltage or amperage associated with the power supplied at the one or more loads exceeds a predetermined critical threshold value.

If it does, the power is switched off in step S15 at the one or more loads by switching off circuit breakers arranged between the power supply and the loads, thereby protecting the loads against imminent damage.

In step S20 the voltage or amperage at the one or more loads are monitored.

In step S25, the monitored loads are compared with amperage or voltage thresholds or ranges/intervals of such thresholds.

In step S30, control commands are issued to on/off switchable switches arranged between the circuit breakers and the loads. The control commands are issued as either "switch on" or "switch off" commands, in dependence on the monitored amperages or voltages or parameters associated therewith. The parameters may include a pre-programmed amount of time throughout which the voltages or amperages are sustained above the thresholds. The parameter may also include a degree indicative to a deviation of the amperages or voltages from a pre-programmed signal pattern.

In step S35, if the issued command is a "switch on" command, the on/off switchable switch is switched on thereby effecting switching on or back on the power at the load or at selected ones of the loads.

In step S40, if the issued command is a "switch off" command, on/off switchable switch is switched off thereby effecting switching off the power at the load or at selected ones of the loads.

The switching on or off in steps S35 or S40 occurs at voltages or amperages lower than the critical threshold value. By way of the steps S35 or S40, a controlling of the distribution of the electrical power throughout the one or more loads is effected and step S10 switching off the circuit breaker for warding off imminent damage may be avoided.

In step S45, if a back-up power supply designed to apply back up power to the loads is found to approach a drained state, the fuses are switched off in a prioritized sequence. In this way, mission critical loads having a higher priority are disconnected from the back-up power supply later than mission critical loads having a lower priority.

In optional step S50, if the power coming from the power supply is a multi-phase signal, the multi-phase signal is split up into three single input phases. In this way, the power may be supplied to the loads separately through the single one-phase signals.

In optional step S50, based on the monitored amperages and voltage, the total load connected is load-balanced across the three input phases.

In addition it should be pointed out that "comprising" does not exclude other elements or steps, and "a" or "one" does not exclude a plural number. Furthermore, it should be pointed out that features or steps which have been described with reference to one of the above exemplary embodiments can also be used in combination with other features or steps of other exemplary embodiments described above. Reference signs in the claims are not to be interpreted as limitations.

The invention claimed is:

1. A non-transitory computer readable medium having stored thereon computer readable instructions suitable to cause a computer to perform the following steps in relation to distributing electrical power to one or more loads:
   switching off power supplied at the one or more loads, when a voltage, or a current, or both, associated with the power supplied at the one or more loads exceeds a predetermined critical threshold value, thereby protecting the loads against damage, said one or more loads being respective end-user devices, taps being associated correspondingly with said devices;
   monitoring, via a monitoring module, a voltage or current at said one or more loads individually by device;
   issuing control commands in response to and in dependence on the monitored voltage or current; and
   switching on or off in response to the issued control commands the supplied power at the one or more taps, said monitoring occurring at said taps so as to effect the individual monitoring, the switching on or off occurring at voltages or currents lower than the critical threshold value, thereby controlling the distribution of the electrical power throughout the one or more loads, among said instructions there being further included an instruction for monitoring, at a mains input to a mains transformer, an electrical characteristic of the power being supplied to said one or more loads, both the monitoring at said one or more loads and the monitoring at said mains input being performed in real time.

* * * * *